United States Patent [19]

Beck

[11] 4,377,337
[45] Mar. 22, 1983

[54] DOCUMENT SCANNING APPARATUS FOR AN ELECTROSTATIC COPIER

[75] Inventor: Christian A. Beck, Ridgefield, Conn.
[73] Assignee: Pitney Bowes Inc., Stamford, Conn.
[21] Appl. No.: 223,978
[22] Filed: Jan. 12, 1981
[51] Int. Cl.³ .................... G03G 15/28; G03G 15/32
[52] U.S. Cl. .......................................... 355/8; 355/84
[58] Field of Search ........................... 355/8, 81, 84

[56] References Cited

U.S. PATENT DOCUMENTS

| | | | |
|---|---|---|---|
| 3,950,090 | 4/1976 | Washio et al. | 355/8 |
| 4,141,545 | 2/1979 | Schnall et al. | 355/8 X |
| 4,159,173 | 6/1979 | Kasuga | 355/8 |
| 4,211,482 | 7/1980 | Arai et al. | 355/8 |
| 4,256,399 | 3/1981 | Ikeda | 355/8 |
| 4,344,696 | 8/1982 | Murata et al. | 355/8 |

Primary Examiner—G. Z. Rubinson
Assistant Examiner—Keith E. George
Attorney, Agent, or Firm—Peter Vrahotes; Albert Scribner; William Soltow, Jr.

[57] ABSTRACT

This invention relates to a drive system for the moving optics of the cable and drum type scanner that may be used in an electrostatic copier. A one piece cable is driven alternately by a pair of drums which are coupled to electromagnetic clutches so that linear document scanning and retracing by an optical carriage is achieved.

6 Claims, 2 Drawing Figures

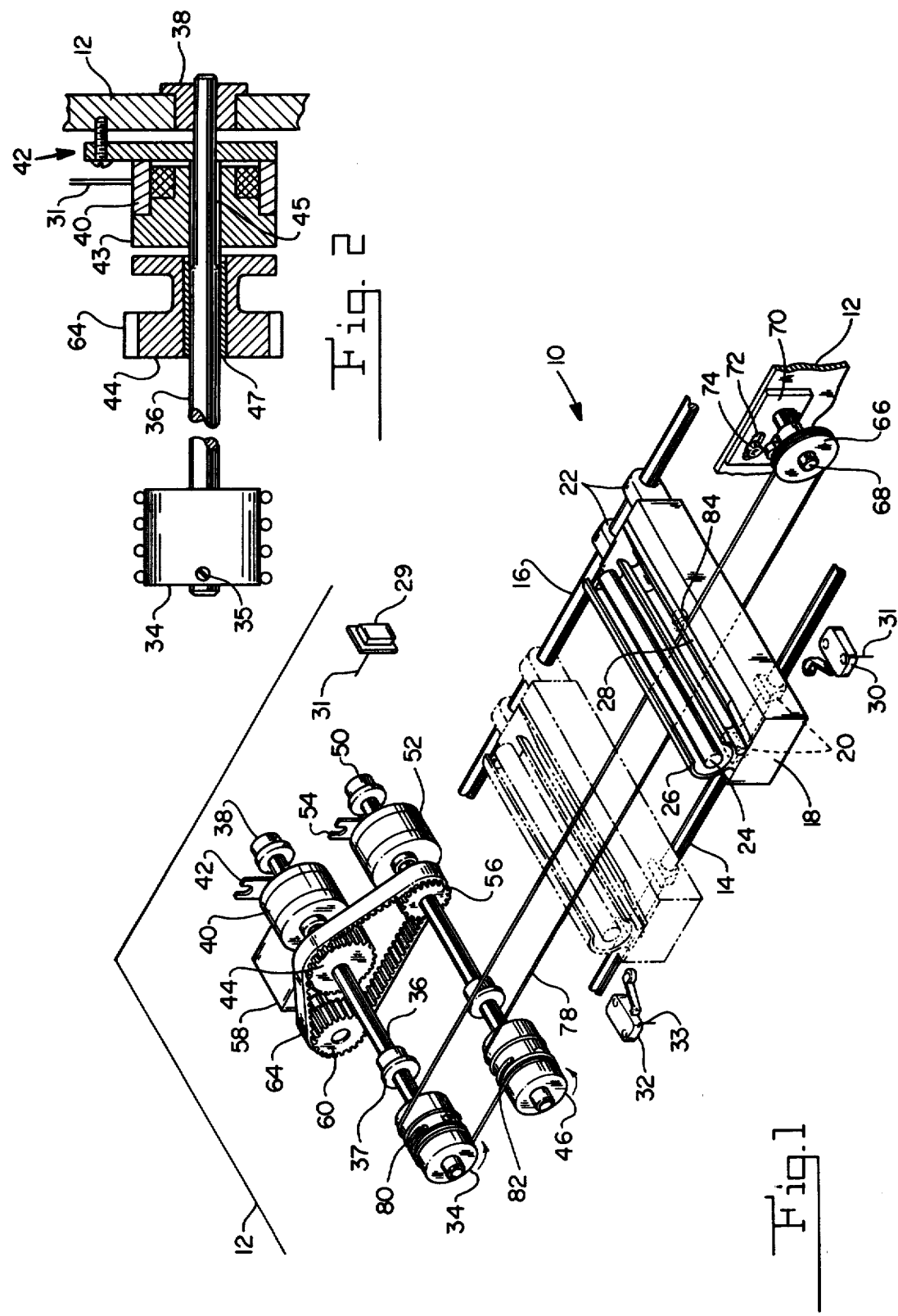

DOCUMENT SCANNING APPARATUS FOR AN ELECTROSTATIC COPIER

BACKGROUND OF THE INVENTION

Electrostatic copiers have an exposure station where an original of which a copy is to be made is imaged upon a photoreceptive surface or the like.

There are generally three types of exposure stations in electrostatic copiers, a reciprocating platen, flash exposure, and moving optics. This invention is directed to those copiers that use moving optics. In moving optics, a light and mirror for reflecting the light onto a platen are secured to a carriage which is conveyed across the underside of the platen and returned to a home position. There are a number of requirements for such a system including guiding the carriage along a uniform path, having the carriage return to the home position faster than it scanned the platen, and having the system compact so that it will not result in a bulky copier. The instant invention is directed to such a moving optical system.

SUMMARY OF THE INVENTION

A moving optic system is provided wherein electromagnetic clutches are incorporated into the drive system for the purpose of driving the carriage in a scanning direction and then in the return or opposite direction. When the carriage is to scan the original to be copied, at which time the light is on, a first electromagnetic clutch is enabled to couple a drive motor to the drive system so as to convey the scanner carriage in a first or scanning direction. When the carriage is to be returned to the home position, the light is turned off, the first clutch is disengaged and a second electromagnetic clutch is coupled to the drive motor whereby the carriage is driven in a second, or opposite, direction to return the scanner carriage to its home position at a speed greater than the speed with which the original is scanned. The drive system uses only a single, or endless, cable that is attached to the carriage and wrapped around drums which are driven by the electromagnetic clutches alternately. This single cable-drum combination allows for a compact driving unit which provides good control and eliminates slippage that would cause unwanted translation jitter in the carriage.

BRIEF DESCRIPTION OF THE DRAWING

FIG. 1 is a perspective view of a moving optic system for an electrostatic copier that incorporates features of the instant invention.

FIG. 2 is a cross sectional view of one of the electromagnetic drum assemblies shown in FIG. 1 that is part of the moving optic system.

DETAILED DESCRIPTION OF THE PREFERRED EMBODIMENT

Referring now to FIG. 1, a drive system for the moving optics of an electrostatic copier is shown generally at 10 and is contained within a copier housing 12. The copier may have the normal components for producing a copy, the functions of which need not be described for the description of the instant invention and are therefor not shown nor discussed. A pair of spaced, longitudinally extending rails 14 and 16 are supported within the housing 12. A carriage 18 has depending therefrom a first pair of journal boxes 20 that receive the rail 14 and a second pair of journal boxes 22 extending therefrom that receive the rail 16 so that the carriage may be slid along the rails as required. The carriage 18 supports a light source 24 that is disposed within a reflecting cover 26 and also supports a mirror 28 that is positioned to reflect the light from the light source 24 in a direction towards the platen (not shown) being scanned. Supported by the housing 12 (by means not shown) are a pair of spaced switches 30 and 32 that are located adjacent the rail 14, the carriage 18 being located intermediate the switches so as to engage one or the other switch as it is reciprocally moved along the rails 14, 16. The switches 30 and 32 have electrical leads 31, 33, respectively, connected thereto. The lead 31 is also connected through an appropriate electrical control system (not shown) to a copy button 29 mounted on the copier housing 12.

Referring now to FIGS. 1 and 2, a drum 34 is mounted on a shaft 36 that is received within a pair of bearings 37 and 38 that are supported by the housing 12. A set screw 35 is received within the drum 34 to selectively secure the drum to the shaft 36. An electromagnetic member 40, to which the lead 31 is connected to provide electrical connection therebetween, rotatably receives the shaft 36 and is supported upon the housing 12 by a bracket assembly 42. The electromagnetic member 40 is activated and de-activated by the switch 30 or by the starter button. A clutch plate 43 is slidably mounted on the shaft 36 for rotation therewith, the clutch plate being repelled from the electromagnetic member 40 when the electromagnetic 40 is activated. The clutch plate 43 may be slidably mounted on the shaft 36 by splines 45 on the diameter of the shaft. A pulley 44 is rotatably disposed upon the shaft 36, there being a plurality of bearings 47 between the two members to allow the pulley to rotate freely relative to the shaft. The pulley 44 is engageable by the clutch plate 43 upon actuation of the electromagnetic clutch 40 to provide drive to the shaft 36. Another drum 46, having substantially the same diameter as the first drum 34, is located below the first drum and is supported by a shaft 48 for rotation therewith. The shaft 48 is rotatably received within a pair of bearings 50 and 51 that are supported by the housing 12. An electromagnetic member 52, to which the lead 33 is attached, is mounted on the housing 12 by a bracket assembly 54 and rotatably receives therein the shaft 48. A clutch plate 55 is slidably mounted on the shaft 48 for rotation therewith and is operative to move upon actuation of the electromagnetic clutch 52. A pulley 56 is disposed upon the shaft 48 for relative rotation thereto and is engageable by the clutch plate 55 upon actuation of the electromagnetic clutch 52. A motor 58 is supported by the housing 12 and has a drive pulley 60 mounted on its output shaft 62. A belt 64 is trained about the pulleys 44, 56 and the motor pulley 60.

Referring now to FIG. 1, an idler pulley 66 is mounted on a stub shaft 68 for rotation thereabout, the stub shaft being supported by a bearing plate 70 which has elongated openings 72 therein. Further, bolts 74 are secured to a portion of a housing 12 and are received within the elongated opening 72. The bolts 74 may be tightened and loosened so as to secure the plate 70 at any selected longitudinal position within the limitations of the elongated openings 72. An endless cable 78 is received within an opening 80 of drum 34, which opening is off center to allow rotation of the drum when the cable is received within the opening. The cable 78 winds around the drum 34, extends towards and about the pulley 66 from whence it winds around the drum 46 and is received within an opening 82 within the drum 46. A clamp 84 is provided to secure the cable 78 to the carriage 18 so that upon movement of the cable the carriage will be carried along therewith.

In operation, the motor 58 will be in running and the drive pulley 60 will drive the belt 64 to rotate the pulleys 44 and 56 about their shafts 36, 48 respectively. When a copy is to be produced by the electrostatic copier in which the moving optics 10 is located, the copy button 29 is pushed and a signal will be sent over the lead 31 to the first electromagnet 40. After the first electromagnet 40 is actuated, the clutch plate 43 will be urged into frictional engagement with the pulley 44 to place the pulley 44 into driving engagement with the belt 64. The drive from the belt 64 will be translated from the pulley 44, through the clutch plate 43, to the shaft 36 so that the drum 34 will rotate in a counterclockwise direction as indicated by the arrows in FIG. 1 and the carriage 18 will be pulled by the cable 78 toward the switch 32. At this time the drum 46 acts as an idler drum and will rotate in a clockwise direction. When the carriage 18 engages the switch 32, the electromagnet 40 is inhibited through the electrical connection provided by the lead 33 and the second electromagnetic 52 is actuated, again through the lead 33, thereby providing drive through the pulley 56 and electromagnetic clutch 52 to shaft 48. This causes the drum 46 to be driven, again in a counterclockwise direction, thereby causing the carriage 18 to move in the opposite direction toward the switch 30. At this time the drum 34 is idled so as to be rotated, in a clockwise direction, by the cable 78. The carriage 18 will move in the second direction until such time it engages the switch 30, which indicates the home position of the carriage, and the second electromagnetic clutch 52 will be disabled through the lead 31. If multiple copies are to be made, the switch would then activate the electromagnet 40 and the cycle would be repeated.

It will be noted that the pulley 60 is larger than the pulley 56 so that when the carriage 12 is moved in the second direction towards the switch 30 it will move faster than the carriage traveled when moved in the direction towards the switch 32. Obviously, various combinations of speed ratios can be achieved depending upon the diameter of pulleys 56, 60 selected.

It will be appreciated that the belt 64 and the pulleys 44, 56 and 60 always rotate in the same direction, counterclockwise. No change of direction is involved except for the cable 78 and the scanner 18. This is occasioned by the drums 34, 46 acting alternatively as drive members and as idlers. This system provides advantages over the prior moving optical systems in terms of eliminating translation jitter in the carriage 18. One factor in reducing jitter is the fact that the cable 78 is secured at three locations, at the carriage and at the drums 34, 46. Another advantage of the system 10 is that the drums 34, 46 may be made identical to one another thereby reducing costs. Also, the cable has no stress risers such as would be created by wrapping around a corner since there is no relative motion of the cable in the general area of the transfer holes 80 and 82.

I claim:

1. A document scanning apparatus for a copier comprising:
    a carriage, means for supporting said carriage for longitudinal movement along a path, first and second switches located along said path and spaced from one another, said carriage being located intermediate said switches, drive means, first and second clutch means, a first shaft received within said first clutch means, a second shaft received within said second clutch means, first and second drums supported upon said first and second shafts, respectively, for rotation therewith, a cable drivingly connected directly to said first and second drums and said carriage, said first clutch means transmitting drive to said first shaft rotatably driving said first drum in a first rotational direction to cause said cable to pull said carriage in a first longitudinal direction upon said first clutch means being enabled and said second clutch means transmitting drive to said second clutch means transmitting drive to said second shaft rotatably driving said second drum in said first rotational direction to cause said cable to pull said carriage in a second longitudinal direction upon said second switch being enabled.

2. The apparatus of claim 1 wherein said first switch is operative to enable said first clutch means to cause said carriage to be driven in said first direction.

3. A document scanning apparatus for a copier comprising:
    a carriage, means for supporting said carriage for longitudinal movement along a path, first and second switches located along said path and spaced from one another, said carriage being located intermediate said switches, drive means, first and second electromagnetic means, a first shaft rotatably received within said first electromagnetic means, a second shaft rotatably received within said second electromagnetic means, a first drum connected to said first shaft, a second drum connected to said second shaft, a cable directly connected to said carriage and said first and second drums to provide driving engagement therebetween, first and second pulleys rotatably disposed upon said first and second shafts, respectively, first and second clutch plates slidably mounted on said first and second shafts, respectively, for rotation therewith intermediate said first and second electromagnetic means and said first and second pulleys, respectively, a belt connected to said drive means and to said first and second pulleys, said first clutch plate being engageable with said first pulley upon said first electromagnetic means being enabled to transmit drive to said first shaft driving said carriage in a first direction and said second clutch plate being engageable with said second pulley upon said second electromagnetic means being enabled to transmit drive to said second shaft to drive said carriage in a second direction upon said carriage engaging second switch.

4. The apparatus of claim 3 including means for enabling said first electromagnetic means when a first copy is to be produced.

5. The apparatus of claim 3 wherein said drive means rotates said pulleys in the same direction and said drums are driven in the same direction by their respective shafts.

6. The apparatus of claim 3 wherein said drums each have an opening therein and said cable is received within each opening and clamped to each of said drums.

* * * * *